(12) United States Patent
Chamayou et al.

(10) Patent No.: US 6,657,021 B2
(45) Date of Patent: Dec. 2, 2003

(54) LIQUID NOZZLE WITH VARIABLE LIQUID LEVEL

(75) Inventors: Jean-Louis Chamayou, Carry le Rouet (FR); Jean-Claude Chinh, St Mitre les Remparts (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 10/221,861

(22) PCT Filed: Mar. 8, 2001

(86) PCT No.: PCT/GB01/01002
§ 371 (c)(1),
(2), (4) Date: Dec. 26, 2002

(87) PCT Pub. No.: WO01/68233
PCT Pub. Date: Sep. 20, 2001

(65) Prior Publication Data
US 2003/0096923 A1 May 22, 2003

(30) Foreign Application Priority Data
Mar. 17, 2000 (FR) .............................. 00 03425

(51) Int. Cl.$^7$ .................................................. C08F 2/34
(52) U.S. Cl. ............................. 526/68; 526/86; 526/901; 526/348; 422/139; 422/143; 422/151
(58) Field of Search ............................ 526/68, 86, 901, 526/348; 422/139, 143, 151

(56) References Cited

U.S. PATENT DOCUMENTS 5,733,510 A * 3/1998 Chinh et al. ................ 422/143
5,962,606 A * 10/1999 Williams et al. ............... 526/88

FOREIGN PATENT DOCUMENTS

FR 2.177.480 11/1973

* cited by examiner

Primary Examiner—David W. Wu
Assistant Examiner—William Cheung
(74) Attorney, Agent, or Firm—Finnegan, Henderson, Farabow, Garrett and Dunner, L.L.P.

(57) ABSTRACT

The present invention relates to a nozzle for the injection of a liquid under pressure (3), comprising a vertical feed pipe (1) surmounted by a hollow head (3), the liquid under pressure being conducted between the outer wall (4) of the vertical feed pipe (1) and an inner tube (5), the upper part of the nozzle comprising at least one lateral orifice (6) for expelling the liquid under pressure (3). This nozzle is characterized in that the upper end of the inner tube (5) of the vertical feed pipe (1) emerges at a height above the lateral orifice(s) (6), thereby making it possible, when stopping the injection of the liquid under pressure (3), to introduce a gas under pressure (8) via the inner tube (5) of the vertical feed pipe (1), which generates an overpressure in the upper part of the nozzle in order, on the one hand, to lower the level of the liquid (9) under pressure (3) below the lateral orifice(s) (6) and, on the other hand, to prevent any backflow of solids, liquids and/or gases, from the medium into which the liquid under pressure (3) is injected, towards the inside of the nozzle.

13 Claims, 1 Drawing Sheet

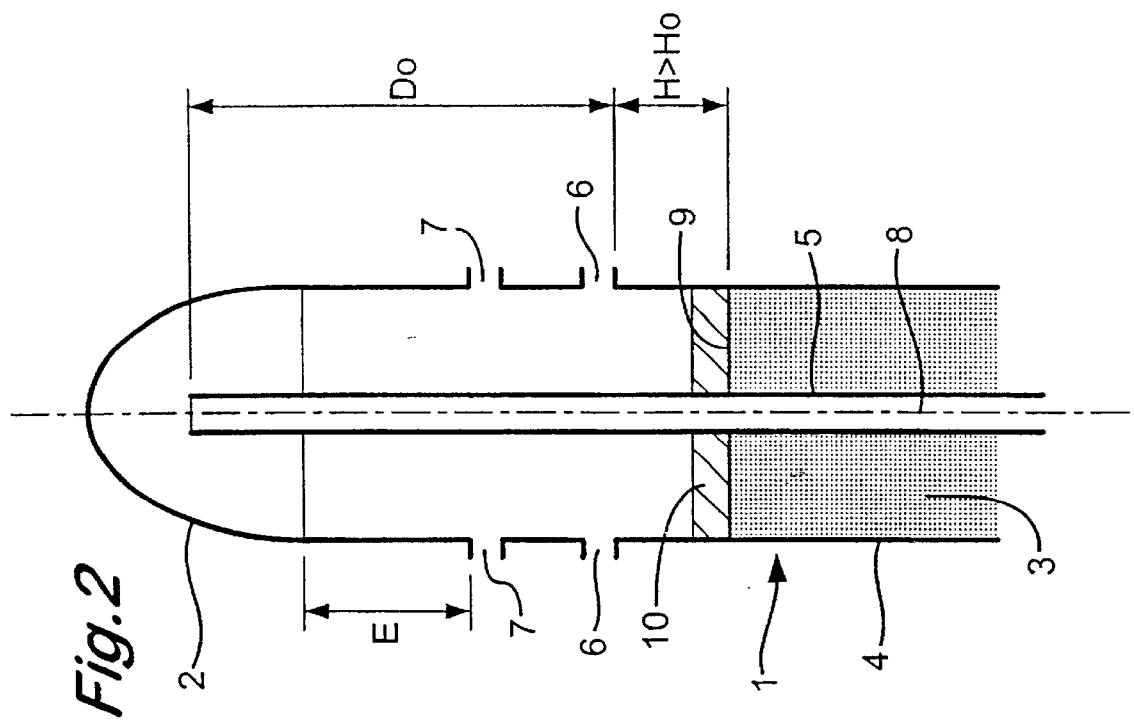
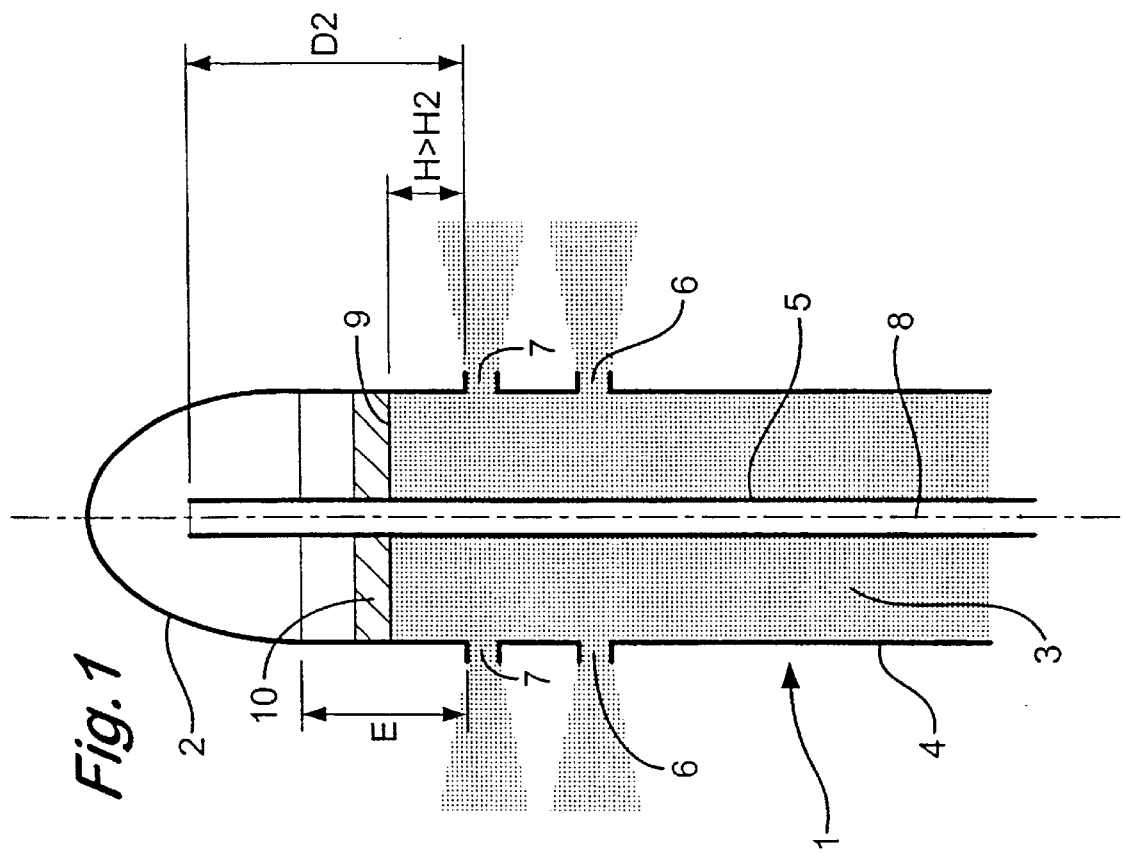

LIQUID NOZZLE WITH VARIABLE LIQUID LEVEL

The present invention relates to a nozzle for the injection of liquid and to its use for the introduction of condensed liquid into a reactor for the gas-phase (co-) polymerization of ethylene and/or propylene in a fluidized bed.

It is known to polymerize one or more monomers in a gas phase at a pressure greater than atmospheric pressure in a fluidized-bed reactor in which polymer particles being formed are maintained in the fluidized state by means of a reaction gas mixture containing the monomer or monomers to be polymerized and flowing in an ascending stream. The polymer thus manufactured, in powder form, is generally withdrawn from the reactor so as to maintain the bed at a more or less constant volume. A preferred industrial-scale process uses a fluidization grid which delivers the reaction gas mixture through the bed and which serves as a support for the bed should the ascending gas flow be cut off. The reaction gas mixture leaving via the top of the fluidized-bed reactor is recycled into the base of the latter, beneath the fluidization grid via an external circulation pipe equipped with a compressor.

The polymerization of the monomers is an exothermic reaction. It is therefore necessary to provide a means suitable for cooling the bed so as to extract the heat of polymerization therefrom. The preferred method for the polymerization of ethylene and/or propylene in a fluidized bed consists in cooling the reaction gas mixture below the polymerization temperature, thereby making it possible, when this fluidization gas passes through the bed, to compensate for the excess heat generated by the polymerization. Thus, during its return, the reaction gas mixture is generally cooled with the aid of at least one heat exchanger placed in the external circulation pipe so as to remove the heat produced by the polymerization reaction and to maintain the polymerization temperature at the desired level.

Attempts have been made, particularly in recent years, to optimize the gas-phase polymerization process so as to increase the polymer production in the existing plants. The process is consequently analysed in terms of polymer production output, namely in terms of weight yield of polymer produced per unit volume of the reactor and per unit time ($kg/h/m^3$). In the commercial fluidized-bed reactors of the abovementioned type, it is known that the production output depends directly on the rate of extraction of the heat generated in the reactor. This extraction rate can be increased, for example by increasing the velocity of the fluidization gas and/or by reducing the temperature of the fluidization gas and/or by increasing the thermal capacity of the fluidization gas.

For example, Patent Application WO 94/28032 describes a gas-phase olefin polymerization process in which the recycle gas stream is cooled to a temperature low enough to form a liquid and a gas. By separating the liquid from the gas and by introducing the liquid directly into the fluidized bed, by means of a nozzle, it is possible to increase the total amount of liquid introduced into the fluidized-bed reactor, thereby allowing better cooling of the bed by evaporation and therefore allowing higher productivity levels to be reached. Many methods for introducing a liquid into a fluidized bed and many nozzles have already been described.

French Patent 2,215,802 describes a process using one or more spray nozzles, the orifice of which is provided with an external non-return valve. The use of such a mechanical means in a nozzle for injecting a liquid very often has the drawback of being limited in reliability, this being due to fatigue of the joints with the moving part(s), to the possibility of the moving part(s) becoming blocked and to possible leaks through the gaps between the moving part(s) and the actual structure of the nozzle.

Patent Applications WO 96/20780 and EP 0,876,202 describe nozzles for the injection of liquid into a gas-phase polymerization reactor. These nozzles are provided with a purge gas which, should the injection of liquid be interrupted, is able to prevent them from being blocked by powder from the fluidized bed. The drawback with this technique is that it causes entrainment or partial atomization of the liquid, particularly during the transient phases when starting or stopping the liquid injection.

The nozzles for injecting a liquid which are described in the prior art, particularly in the aforementioned patents, are often ill-suited for the transient, stopping and starting phases but also throughout the duration of the shutdown of the liquid injection. This is because, during these transient or steady-state phases, the following problems may arise:

(i) blockage of the orifices for expelling the liquid with solid particles, (ii) contamination of the internal parts of the nozzle with solid particles, with liquid and/or with gas, (iii) entrainment or atomization of the liquid by a purge gas.

The abovementioned problems may arise, especially in the case of the use of the nozzles described in the prior art for introducing a condensed liquid into a reactor for the gas-phase (co)polymerization of ethylene and/or propylene in a fluidized bed, and more particularly for the transient, stopping and starting phases but also throughout the duration of the shutdown of the liquid injection. The above mentioned problems may arise as follows:

(i) the blockage of the orifices for expelling the liquid with solid particles, and this is all the more prejudicial when these particles are reactive and can stick together and to the nozzle;

(ii) the contamination of the internal parts of the nozzle with solid particles, with liquid and/or gas may generate chemical reactions within the nozzle, resulting in blockages;

(iii) the entrainment or atomization of the liquid by a purge gas may result in partial or complete vaporization of the liquid inside the nozzle, thus limiting its action of cooling the fluidized bed. Another consequence is that the contact area between the gas and the liquid is increased in such a way that the active particles which are in the liquid phase could react with the purge gas (the latter not necessarily being inert) and could coarsen until reaching the sedimentation or blockage limit of the nozzle.

An apparatus consisting of a nozzle for injecting a liquid under pressure has now been found which makes it possible:

(1) to prevent any backflow of solid, liquid or gas, from the medium into which the liquid is injected, towards the inside of the nozzle, (2) to prevent the entrainment or atomization of the injected liquid by a purge gas, and (3) to maintain high reliability.

Thus, the present invention is a nozzle for the injection of a liquid under pressure, comprising a vertical feed pipe surmounted by a hollow head, the liquid under pressure being conducted between the outer wall of the vertical feed pipe and an inner tube, the upper part of the nozzle comprising at least one lateral orifice for expelling the liquid under pressure, characterized in that the upper end of the inner tube of the vertical feed pipe emerges at a height above the lateral orifice(s), thereby making it possible, when stopping the injection of the liquid under pressure, to introduce a gas under pressure via the inner tube of the vertical feed pipe, which generates an overpressure in the upper part of the nozzle in order, on the one hand, to lower the level of the liquid under pressure to below the lateral orifice(s) and, on the other hand, to prevent any backflow of solids, liquids and/or gases, from the medium into which the liquid under pressure is injected, towards the inside of the nozzle.

A non-limiting example of the device of the invention is shown schematically in FIGS. 1 and 2.

According to the present invention, the nozzle comprises a vertical feed pipe which is used to conduct the liquid under pressure from the base of the said pipe towards the upper part of the nozzle. Preferably, the feed pipe has a cylindrical shape.

Hereafter, the term "outer wall" of the vertical feed pipe will refer to the pipe itself without its internal parts. In the preferred case in which the vertical feed pipe is cylindrical, the term "outer wall" of the said pipe will refer to the outer tube of this same pipe.

According to the present invention, an inner tube inside the outer wall of the vertical feed pipe makes it possible to introduce a gas under pressure from the base of the said tube towards its upper part. This tube is preferably cylindrical and concentric with respect to the outer wall of the vertical feed pipe.

According to the present invention, the vertical feed pipe of the nozzle is surmounted by a hollow head. This section is in the extension of the upper part of the outer wall of the vertical feed pipe of the nozzle. This section may be roughly conical or hemispherical, preferably roughly conical.

According to the present invention, the upper part of the nozzle comprises at least one lateral orifice for expelling the liquid under pressure. In the case in which there is more than one lateral orifice, these may be grouped together either around the nozzle at the same level or at several levels. The number of levels may vary from 1 to 4, preferably from 1 to 2. Generally, the lateral orifices are placed around the circumference of the nozzle so as to be equidistant. The number of lateral orifices per level may be between 1 and 8, preferably between 4 and 8. This (or these) lateral orifice(s) may have a shape making it possible to optimize the penetration of the liquid as well as the shape of the liquid jet(s) outside the nozzle. By calculating the pressure drop of the liquid across the lateral orifice, it is possible to calculate a liquid injection velocity and, finally, to determine, from the shape of the orifice(s), a spray volume per unit of volume flow. The lateral orifice(s) may have a hole or a slit, preferably a hole. The shape of the orifice(s) may be circular, an ellipsoid shape or of any other suitable shape. Preferably, the orifice(s) is a hole having a circular shape. The length of an ellipsoid shaped lateral orifice may be between 8 and 50 mm, the width between 2.5 and 12 mm and the area between 26 and 580 $mm^2$. The diameter of a circular orifice may be between 5 and 25 mm and the area between 19.6 and 491 $mm^2$. It is important for the lateral orifice(s) to be sufficiently wide to allow passage of solid fine particles which may be in the liquid under pressure.

The lateral orifice(s) may also comprise mechanical components making it possible to atomize the liquid under pressure as it leaves the said orifices, as described in Patent Application WO 98/18548.

According to the present invention, the lateral orifice(s) of the nozzle is located in its upper part. It may be located on the vertical feed pipe or else on the hollow head which sits on top of the upper part of the latter. Preferably, the lateral orifice(s) is located on the vertical feed pipe.

According to the present invention, the upper end of the inner tube of the feed pipe emerges at a height above the lateral orifices. The index for the various levels of lateral orifices on the feed pipe is defined by the letter "i", starting with 1 for the lower level. In addition, $D_i$ defines the distance between the upper end of the inner tube of the feed pipe and the upper part of the lateral orifices of level i. In the same way, $D_o$ defines the distance between the upper end of the inner tube of the feed pipe and the lower part of the lateral orifices of the lower level. It may be noted that $D_i$ is always greater than $D_o$ and that, in the case in which there is only a single level of lateral orifices, the difference between $D_i$ and $D_o$ is equal to the height of the said orifices. The distances $D_i$ and $D_o$ may be determined according to the pressure fluctuations between the gas under pressure and the liquid under pressure. These distances $D_i$ and $D_o$ may be greater than 100 mm, preferably greater than 500 mm.

The differential pressure between the gas and the liquid is defined as the difference between the absolute or relative pressures of the gas under pressure and of the liquid under pressure, the said pressures being measured in the vertical feed pipe or at any point upstream of the said pipe. If the pressures of the gas and of the liquid are measured at different heights, it is necessary to subtract the pressure of the liquid column between these two heights, often called the delivery head, from the said differential pressure.

An improved form of the invention may consist in maintaining the differential pressure DP between the gas and the liquid at a constant value and this being achieved by acting on the pressure of the purge gas. The pressure of the liquid to be injected may then vary of course depending on its flow rate.

In general, all values of differential pressure between the gas and the liquid may be associated with a level of liquid under pressure in the nozzle. By varying this differential pressure, it is possible to change the level of liquid under pressure in the nozzle so as to start or stop the injection of liquid. If the nozzle has several levels of lateral orifices, it is possible to vary the number of lateral orifices used for injecting the liquid under pressure, in this way making it possible to adapt the injection velocity through the lateral orifices, the penetration of the jets of the said liquid to the outside of the nozzle and therefore the spraying volume produced by the said liquid.

In order to inject the liquid under pressure via the lateral orifices ranging from levels 1 to i, the differential pressure between the gas and the liquid must be maintained below a limit $P_i$ which corresponds to a level of liquid under pressure in the nozzle above the upper part of the lateral orifices on level i. This limit $P_i$ may be calculated as a function of:

i) the density R of the liquid under pressure, ii) the distance $D_i$ and iii) the desired minimum height $H_i$ between the upper part of the lateral orifices in the level i and of the level of liquid under pressure in the nozzle, via the following formula: $P_i = R*g*(D_i - H_i)$.

In order to stop the injection of liquid under pressure, the differential pressure between the gas and the liquid must be maintained above a limit $P_o$ which corresponds to a level of liquid under pressure in the nozzle below the lower part of the lateral orifices on the lower level. This limit $P_o$ may be calculated as a function of:

i) the density R of the injection liquid, ii) the distance $D_o$ and iii) the desired minimum height Ho between the lower part of the orifices and the level of liquid under pressure in the nozzle, via the following formula: Po=R*g*(Do−Ho).

A more elaborate form of nozzle for the injection of a liquid under pressure may consist in placing the lateral orifice(s) in the upper part of the vertical feed pipe of the nozzle, at a distance E below the hollow head, and in physically defining the surface of the liquid under pressure in the nozzle by a cylindrical float hollowed out along its longitudinal axis, the said float sliding along the inner tube of the vertical feed pipe, inside the outer wall of the vertical feed pipe, floating on the surface of the liquid under pressure and having a thickness of less than E. In order to facilitate the movement of the float, the latter must have an external diameter slightly less than the internal diameter of the cylindrical outer wall, a diameter of the hole slightly greater than the external diameter of the inner tube of the vertical feed pipe, with a clearance which allows the sliding to take place and ensures good sealing between the liquid under pressure and the gas under pressure when the injection of the liquid under pressure is stopped and restarted.

The external diameter of the float, Dfe, and the diameter of the hole in the same float, Dfi, may be calculated, from the internal diameter of the cylindrical outer wall of the nozzle, Dei, and the external diameter of the inner tube of the vertical feed pipe, Dte, in the following manner:

(i) Dfe=Dei−x, x ranging from 0.1 to 5 mm, preferably from 0.5 to 1 mm, and (ii) Dfi=Dte+y, y ranging from 0.1 to 5 mm, preferably from 0.5 to 1 mm.

According to the present invention, the nozzle for the injection of a liquid under pressure may be used for injecting any liquid under pressure, whose viscosity, at the temperature and pressure conditions at which the said nozzle is used, is low enough to allow continuous flow. The nozzle for the injection of a liquid under pressure may be used in any medium, comprising at least one phase which may be solid, liquid or gaseous and which allows the liquid to be injected into the said medium.

According to a process claimed in the present invention, the nozzle described above is used for the introduction of condensed liquid into a fluidized-bed polymerization reactor. This is a continuous process for the gas-phase polymerization of an olefin monomer chosen from (a) ethylene, (b) propylene, (c) a mixture thereof, and one of more other alpha-olefins, in combination with (a), (b) or (c), in a fluidized-bed reactor, for which the gas phase is continuously recycled through the fluidized bed in the presence of a polymerization catalyst under reactive conditions, the recycled gas phase is cooled to a temperature at which the liquid condenses, the said condensed liquid is separated from the gas phase and is introduced directly into the fluidized bed using one or more nozzles, described above.

The nozzles may be placed at any point in the fluidized bed and may be fed separately, in series or in parallel, by conventional devices such as straight or annular manifolds.

The reactor preferably comprises four or six nozzles. These nozzles may, for example, pass through the fluidization grid so that the orifices lie well within the fluidized bed, preferably in the lower part of the fluidized bed. By way of example, for a commercial reactor having a fluidized bed with a height ranging from 10 to 20 mn above the grid, the orifices of the nozzles are located above the said grid and below a height ranging from 3 to 7 m above the said grid.

The device consisting of a nozzle for the injection of a liquid under pressure, as described in the invention, has many advantages.

One of the advantages resides in the fact that any backflow of solid, liquid or gas, from the medium into which the liquid under pressure is injected, towards the inside of the nozzle is prevented. Thus, the risk of a blockage in the lateral orifices or inside the nozzle is reduced. Likewise the risk of contaminating the liquid under pressure with solids, liquids or gases is also singularly reduced.

The use of the nozzle for the introduction of condensed liquid into a reactor for the gas-phase (co)polymerization of ethylene and/or propylene in a fluidized bed also has many advantages.

One of the advantages is the absence of entrainment or atomization of the condensed liquid by the gas under pressure. The vaporization of the condensed liquid, which takes place outside the nozzle, makes it possible to optimize the cooling of the fluidized bed. Compared with a technique for which there is a tendency for the condensed liquid to be entrained or atomized by a gas under pressure, the area of contact between the said gas and the condensed liquid is reduced. This makes it possible to reduce the risk of the active particles in the condensed liquid reacting with the gas under pressure (the latter not necessarily-being inert) for coarsening up to the limit for sedimentation or blockage of the nozzle.

One advantage is that it also prevents active solid particles of the fluidized bed from reacting in the lateral orifices or in the nozzle itself.

Another advantage is that it prevents the reactive mixture in the reactor from contaminating the inside of the nozzles, something which could result in reactions with the still-active fine solid particles of the condensed liquid and could create blockages upstream of the lateral orifices.

Yet another advantage, in the case of a nozzle provided with several levels of orifices, is that the number of orifices which are used to inject the liquid can be changed by varying the differential pressure between the purge gas and the injection liquid. This makes it possible, for a given flow rate of condensed liquid, to control the injection velocity at the lateral orifices, the penetration of the jets of the said liquid to the outside of the nozzle and therefore the spraying volume. This is particularly advantageous for maintaining the fluidization.

The use of the device consisting of the nozzle for the injection of a liquid under pressure, applied to polymerization in a fluidized bed, offers a considerable technical and economical advantage because it allows effective control of the polymerization reaction both from the thermal standpoint and from the standpoint of the polymerization conditions.

The general conditions for the polymerization are, for example, those described in Example 1 of Patent WO 99/00430, except, for the use of the nozzle according to the present invention.

BRIEF DESCRIPTIONS OF THE DRAWINGS

The appended FIGS. 1 and 2 represent a non-limiting example of the device of the invention. FIG. 1 shows where the liquid injection is carried out using two levels of lateral orifices. FIG. 2 shows the same nozzle when stopped.

FIGS. 1 and 2 show the same nozzle which comprises a vertical feed pipe (1) surmounted by a hollow head (2). The liquid under pressure (3) is conducted between the outer wall (4) of the vertical feed pipe (1) and the inner tube (5). The upper part of the nozzle comprises two levels of lateral orifices (6) and (7) for expelling the liquid under pressure (3). The upper end of the inner tube (5) of the vertical feed pipe (1) emerges at a height above the lateral orifices (7), thereby making it possible, when stopping the injection of the liquid (3) under pressure, to introduce a gas under pressure (8) via the inner tube (5) of the vertical feed pipe (1), which generates an overpressure in the upper part of the nozzle in order, on the one hand, to lower the level (9) of the liquid under pressure below the lateral orifices (6) of the lower level and, on the other hand, to prevent any backflow of solids, liquids and/or gases, from the medium into which the liquid is injected, towards the inside of the nozzle.

In this example, the lateral orifices (7) of the upper level are located in the upper part of the vertical feed pipe (1) of the nozzle at a distance E below the hollow head (2). The surface of the liquid (9) is physically defined in the nozzle by a cylindrical float (10) hollowed out along its longitudinal axis, the said float sliding along the inner tube (5) of the vertical feed pipe, inside the outer wall (4) of the vertical feed pipe, floating on the surface of the liquid (9) and having a thickness less than E.

FIG. 1 shows a nozzle which injects liquid under pressure via the lateral orifices (6) and (7) on both orifice levels. The differential pressure between the gas and the liquid must be maintained below a limit P2 which corresponds to a level of liquid under pressure in the nozzle above the upper part of the lateral orifices (7) on the upper level of the said orifices (index 2). This limit P2 may be calculated as a function of:
  i) the density R of the liquid under pressure,
  ii) the distance D2 and
  iii) the desired minimum height H2 between the upper part of the orifices of the upper level (index 2) and the level of liquid under pressure in the nozzle, by the following formula: $P2 = R*g*(D2-H2)$.

FIG. 2 shows a nozzle when stopped, that is to say when the liquid is not being injected. The differential pressure between the gas and the liquid must be maintained above a limit Po which corresponds to a level of liquid under pressure in the nozzle below the lower part of the lateral orifices (6) of the lower level. This limit Po may be calculated as a function of:
  i) the density R of the liquid under pressure,
  ii) the distance Do and
  iii) the desired minimum height Ho between the lower part of the orifices of the lower level and the level of liquid under pressure in the nozzle, by the following formula: $Po = R*g*(Do+Ho)$.

What is claimed is:

1. Nozzle for the injection of a liquid under pressure, comprising a vertical feed pipe surmounted by a hollow head, the liquid under pressure being conducted between the outer wall of the vertical feed pipe and an inner tube, the upper part of the nozzle comprising at least one lateral orifice for expelling the liquid under pressure, wherein the upper end of the inner tube of the vertical feed pipe emerges at a height above the lateral orifice(s), thereby making it possible, when stopping the injection of the liquid under pressure, to introduce a gas under pressure via the inner tube of the vertical feed pipe, which generates an overpressure in the upper part of the nozzle in order, on the one hand, to lower the level of the liquid under pressure below the lateral orifice(s) and, on the other hand, to prevent any backflow of solids, liquids and/or gases, from the medium into which the liquid under pressure is injected, towards the inside of the nozzle.

2. Device according to claim 1, wherein the nozzle comprises a vertical feed pipe which has a cylindrical shape and inside which the inner tube, which makes it possible to introduce a gas under pressure, is cylindrical and concentric with respect to the outer wall of the vertical feed pipe.

3. Device according to claim 2, wherein the hollow head is roughly conical.

4. Device according to claim 1, wherein the upper part of the nozzle comprises lateral orifices grouped together on 1 to 4 levels.

5. Device according to claim 4, wherein the lateral orifices are placed around the circumference of the nozzle so as to be equidistant and in that the number of lateral orifices per level is between 1 and 8.

6. Device according to claim 5, wherein the lateral orifices are holes of circular shape, the diameter of which is between 5 and 25 mm.

7. Device according to claim 5, wherein the lateral orifices comprise mechanical components making it possible to atomize the liquid under pressure.

8. Device according to claim 1, wherein the lateral orifices are located in the upper part of the vertical feed pipe of the nozzle, at a distance E below the hollow head, and the surface of the liquid under pressure in the nozzle is physically defined by a cylindrical float having a hole along its longitudinal axis, the float sliding along the inner tube of the vertical feed pipe, inside the outer wall of the vertical feed pipe, floating on the surface of the liquid under pressure and having a thickness of less than E.

9. Device according to claim 8, wherein the external diameter of the float, Dfe, and the diameter of the hole in the float, Dfi, are calculated from the internal diameter of the cylindrical outer wall of the nozzle, Dei, and the external diameter of the inner tube of the vertical feed pipe, Dte, in the following manner:
  (i) Dfe=Dei−x, x ranging from 0.1 to 5 mm and
  (ii) Dfi−Dte+y, y ranging from 0.1 to 5 mm.

10. A continuous process for the gas-phase polymerization of an olefin monomer chosen from (a) ethylene, (b) propylene, (c) a mixture thereof, and one or more other alpha-olefins in combination with (a), (b) or (c), in a fluidized-bed reactor, for which the gas phase is continuously recycled through the fluidized bed in the presence of a polymerization catalyst under reactive conditions, the recycled gas phase is cooled to a temperature at which the liquid condenses, the said condensed liquid is separated from the gas phase and is introduced directly into the fluidized bed, wherein the condensed liquid is injected into the bed using one or more nozzles according to claim 1.

11. Process according to claim 10, wherein the polymerization reactor comprises 4 or 6 nozzles.

12. Device according to claim 4, wherein the upper part of the nozzle comprises lateral orifices grouped together on 1 to 2 levels.

13. Device according to claim 5, wherein the number of lateral orifices per level is between 4 and 8.

* * * * *